T. F. McMAIN & J. L. HAYDEN.
Tobacco-Stripping and Smoothing-Machines.
No. 146,540. Patented Jan. 20, 1874.

Witnesses.
D. P. Cowl
Edmund Masson

Inventors.
Thomas F. McMain, and
Joseph L. Hayden,
By atty A. B. Stoughton.

UNITED STATES PATENT OFFICE.

THOMAS F. McMAIN, OF WESTFIELD, AND JOSEPH L. HAYDEN, OF WILLIAMSBURG, MASSACHUSETTS.

IMPROVEMENT IN TOBACCO STRIPPING AND SMOOTHING MACHINES.

Specification forming part of Letters Patent No. 146,540, dated January 20, 1874; application filed July 26, 1873.

*To all whom it may concern:*

Be it known that we, THOMAS F. McMAIN, of Westfield, in the county of Hampden and State of Massachusetts, and JOSEPH L. HAYDEN, of Williamsburg, in the county of Hampshire and State of Massachusetts, have invented certain new and useful Improvements in Machines for Stripping and Smoothing Tobacco-Leaves; and we do hereby declare the following to be a full, clear, and exact description of the same, reference being had to the accompanying drawings making a part of this specification, in which—

Figure 1:
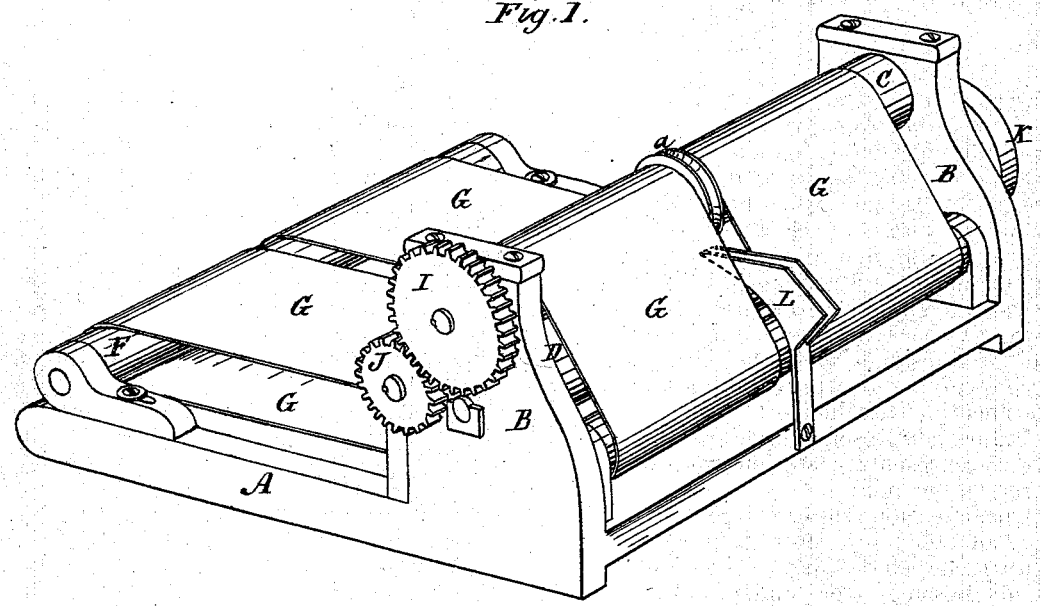
Figure 2:
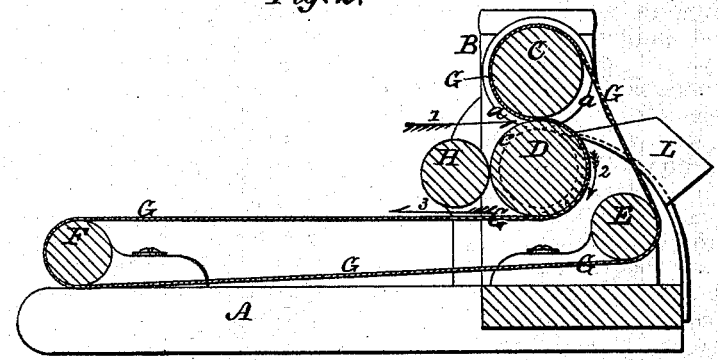

Figure 1 represents a perspective view, and Fig. 2 represents a section through the machine in question.

Our invention relates to a machine for stripping or stemming tobacco, in which a series of driven rolls, a pair of endless belts or bands passing over, under, or around said rolls, and a stem separator or cutter are so combined and arranged as that the tobacco-leaves fed into said machine will be divested of their stems, straightened, smoothed, and pressed, and come out at that end of the machine that they were fed in at, whence they may be taken off and "booked" in the usual well-known way.

To enable others skilled in the art to make and use our invention, we will proceed to describe the same with reference to the drawings.

On a suitable frame or bed, A, and in pillar-blocks B, are arranged two rollers, C D, one immediately over the the other, as seen in Fig. 2. A little below and in rear of the plane of the lower roller, D, of the pair there is hung a third roller, E, and at or near the front of the machine is hung a fourth roller, F. Over, between, and around these four rollers is passed an endless divided belt or band, G, which is in the nature of two belts or bands, as will be explained. In front of the roller D, and quite near to it, is arranged a clearing-roller, H, which is driven from or by the roller C through the gears I J, said roller H receiving thereby a faster peripheral motion than the roller D. The roller C is driven by the friction of the endless belt or band G, the power to drive the series of rolls being communicated to the roller D, through a pulley, K, on the journal of said roller D, or otherwise, over which a band or belt may pass from any first moving power. At a central position on the roller C there are arranged two cutting disks or edges, $a\ a$, which project slightly beyond the periphery of said roller; and in the under roller, D, immediately below, and so as to receive these cutting-edges $a\ a$, there is a groove, $c$, the edges of which may form, with the disks $a$, shearing-edges for severing the leaves of tobacco on each side of the stem thereof. At the rear of the machine, and directly behind the cutters, is a trough or guide, L, for conveying away the stems after the leaf has been separated from it. The belt or belts G are so made as to pass on both sides of the cutting mechanism, and to carry with them the two portions of the leaf that are separated from the stem, and to press, flatten, or smooth out said portions of the leaf before they are delivered from between the belts and the roller D. Should there be any tendency of portions of the leaves to cling to the roller D, the action and quicker motion of the roller H will loosen them therefrom, and allow them to pass out, whence they are removed and booked in the usual well-known way.

It will be perceived, from the direction in which the belts G move, that the stripped or stemmed leaf comes out at the same side of the machine that the unstripped or natural leaf is fed in at; and that, in thus passing through the machine, besides being divested of its stem, the leaf is pressed and straightened out.

The leaf of tobacco is fed in in the direction and at the point indicated by the arrow 1. The stem is cut out by the cutters $a\ c$, and passes out at L, while the two parts of the leaf pass in between the endless belts G and the roll D, and moving around in the direction of the arrow 2, are pressed and straightened out, and come out at and in the direction of the arrow 3, so that they are received at the same side of the machine where the leaf is fed in;

and one person can feed in the leaves and attend to the delivery of the two divided parts thereof without leaving his position.

Having thus fully described our invention, what we claim therein as new, and desire to secure by Letters Patent, is—

In a tobacco-leaf stemming or stripping machine, the combination of the rollers C D E F, the endless belts G passing over, under, and around said rollers, and the cutting or shearing edges $a\, c$, as and for the purpose described and represented.

THOMAS F. McMAIN.
JOSEPH L. HAYDEN.

Witnesses:
 WARNER S. SMITH,
 THOMAS F. VAUGHN, Jr.